United States Patent
Hopkin et al.

(10) Patent No.: US 10,663,776 B1
(45) Date of Patent: May 26, 2020

(54) ENHANCED PRIVACY SWITCHABLE BACKLIGHT SYSTEM

(71) Applicant: Sharp Kabushiki Kaisha, Osaka (JP)

(72) Inventors: Hywel Hopkin, Oxford (GB); Nathan James Smith, Oxford (GB); Andrew Acreman, Oxford (GB); Emma Jayne Walton, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 16/263,295

(22) Filed: Jan. 31, 2019

(51) Int. Cl.
| | |
|---|---|
| *G02F 1/133* | (2006.01) |
| *G02F 1/13* | (2006.01) |
| *G02F 1/13357* | (2006.01) |
| *F21V 8/00* | (2006.01) |
| *G09G 3/34* | (2006.01) |

(52) U.S. Cl.
CPC ......... *G02F 1/1323* (2013.01); *G02B 6/0031* (2013.01); *G02B 6/0041* (2013.01); *G02B 6/0076* (2013.01); *G02F 1/133602* (2013.01); *G09G 3/3426* (2013.01); *G02F 2001/133626* (2013.01); *G02F 2203/62* (2013.01); *G09G 2320/068* (2013.01)

(58) Field of Classification Search
None
See application file for complete search history.

(56) References Cited

U.S. PATENT DOCUMENTS

| | | | |
|---|---|---|---|
| 9,881,531 B2 | 1/2018 | Klippstein et al. | |
| 2014/0361990 A1* | 12/2014 | Leister | G02F 1/1323 345/156 |

OTHER PUBLICATIONS

Jae-Won Huh et al.: "Ion-doped liquid-crystal cell with low opaque-state specular transmittance based on electro-hydrodynamic effect", Dyes and Pigments 150, pp. 16-20, 2018, https://doi.org/10.1016/j.dyepig.2017.11.001.

* cited by examiner

*Primary Examiner* — James A Dudek
(74) *Attorney, Agent, or Firm* — Renner, Otto, Boiselle & Sklar, LLP

(57) ABSTRACT

A display component controls a viewing angle in a display system that achieves a strong private mode and enhanced brightness in the private and public modes as compared to conventional configurations. A display system that is operable in the private mode and the public mode includes the display component in combination with an image panel. The display component includes a backlight unit that emits light from a non-viewing side of the display component toward a viewing side of the display component; a barrier and slit structure located on a viewing side of the backlight unit, the barrier and slit structure comprising a plurality of opaque barrier regions interspersed with a plurality of transparent slit regions; and a lens array of lens elements located on a viewing side of the barrier and slit structure, with the lens elements being located in a separate plane relative to the barrier regions, wherein the barrier and slit structure and the lens array operate to transmit light from the backlight unit collimated in a limited viewing angle range.

18 Claims, 17 Drawing Sheets

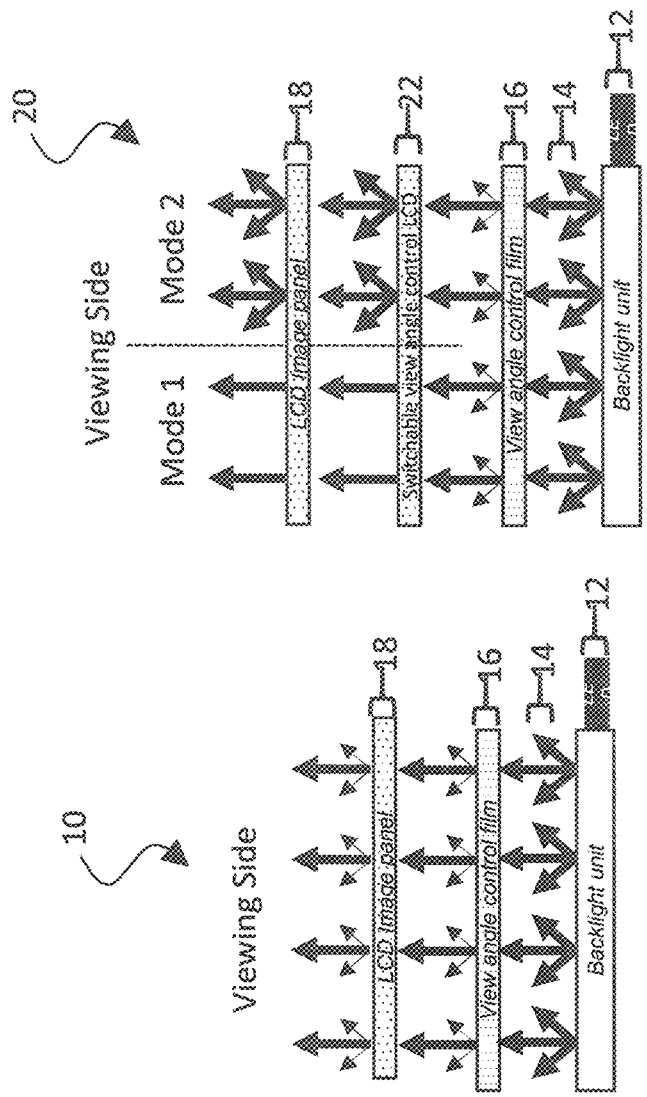

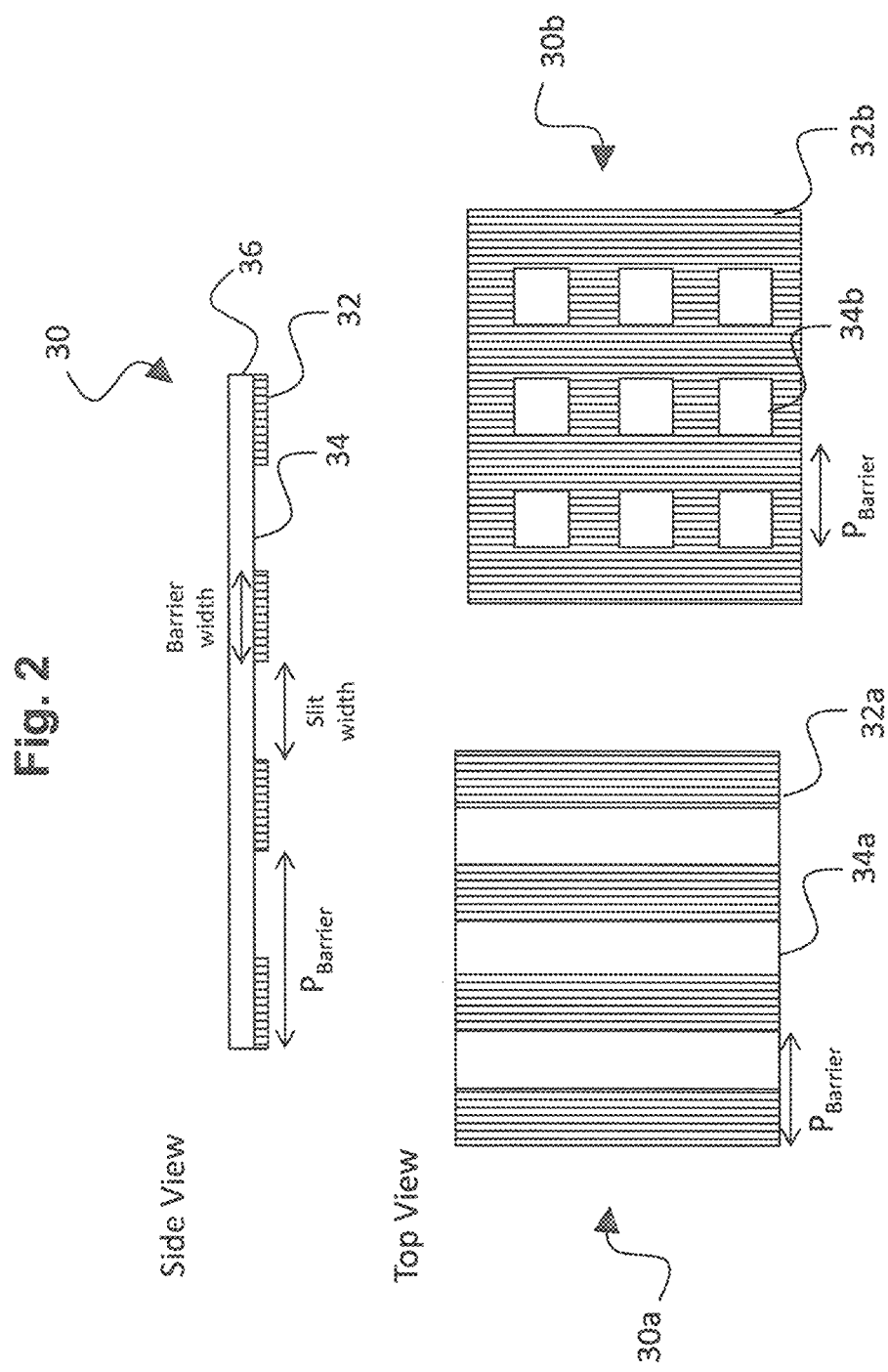

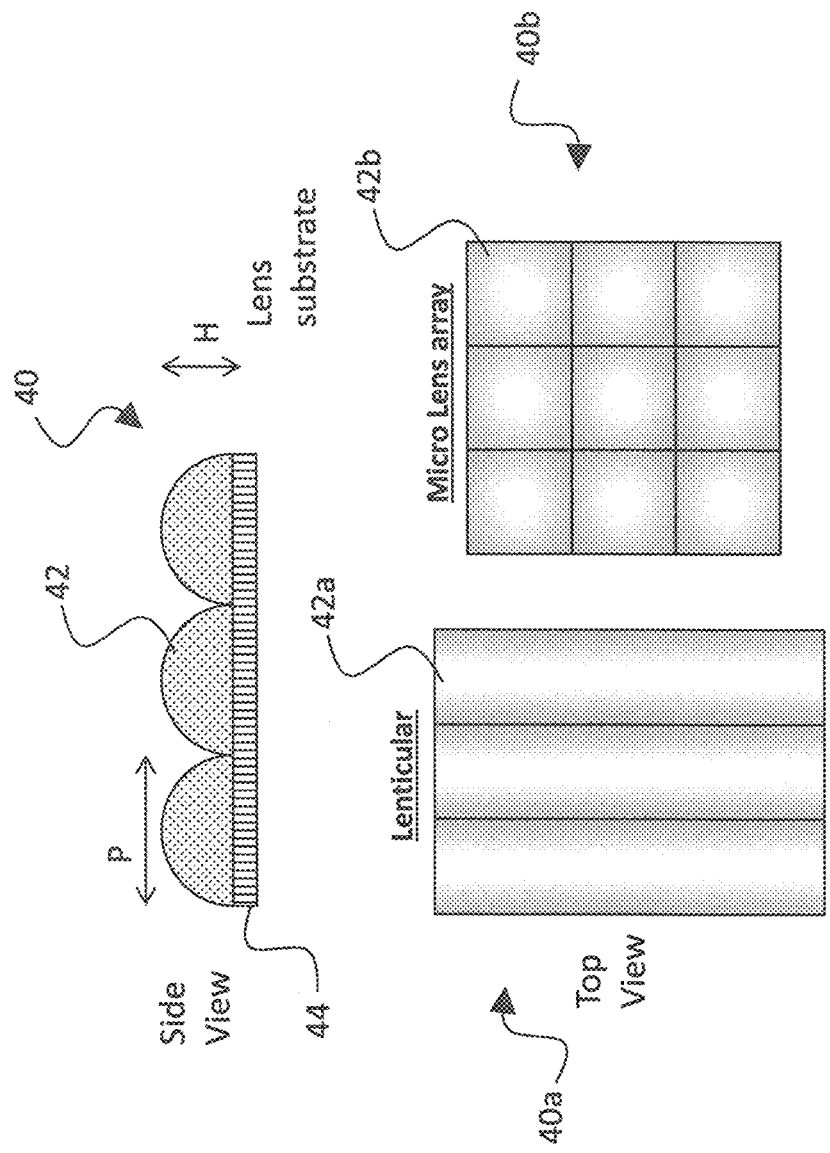

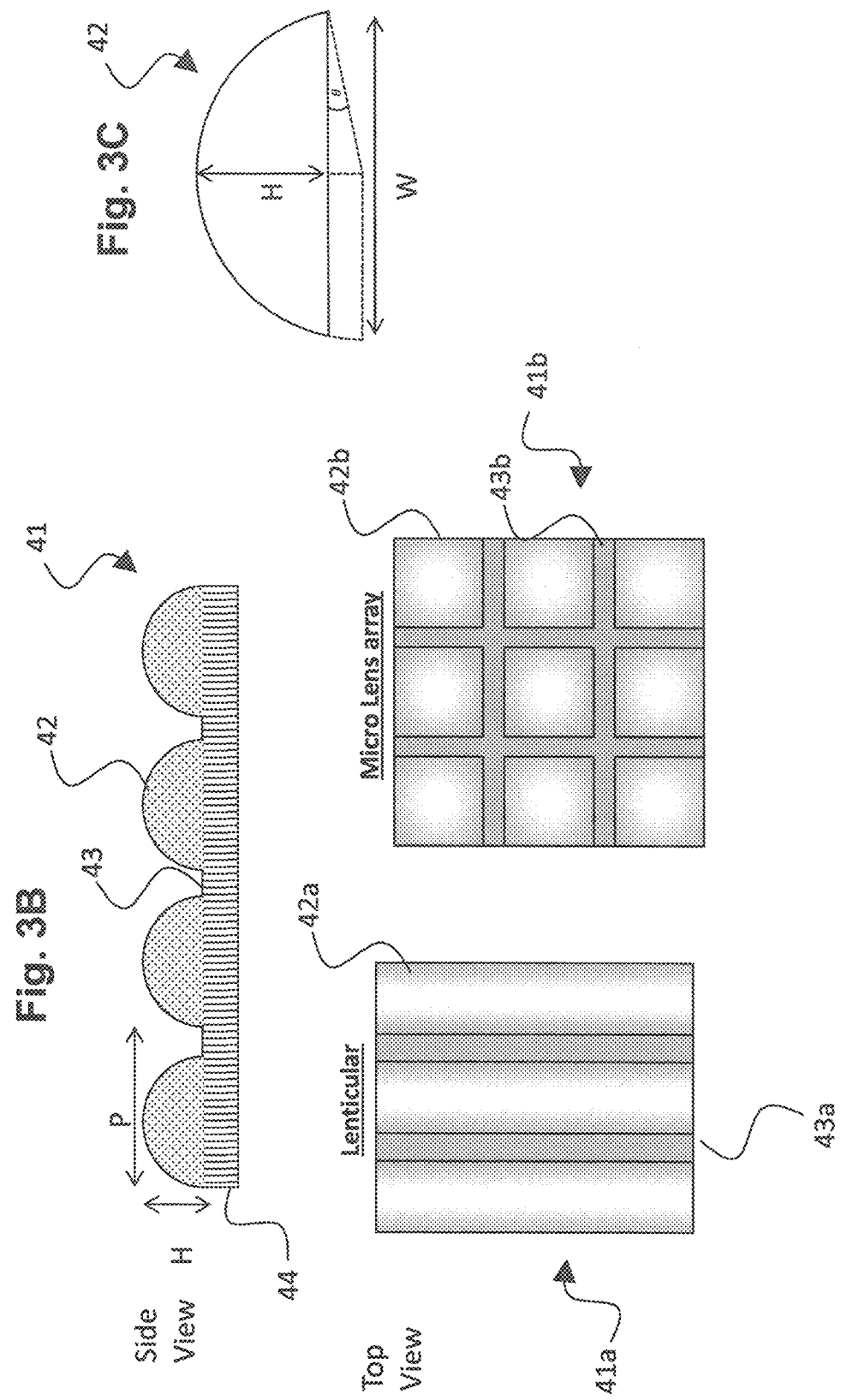

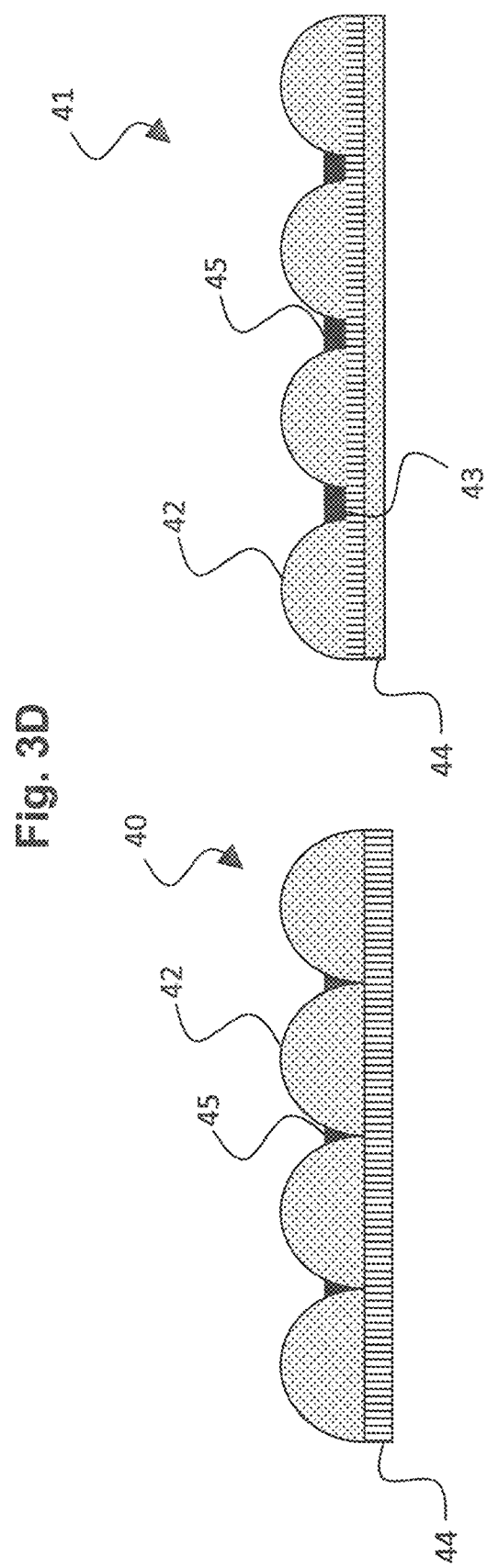

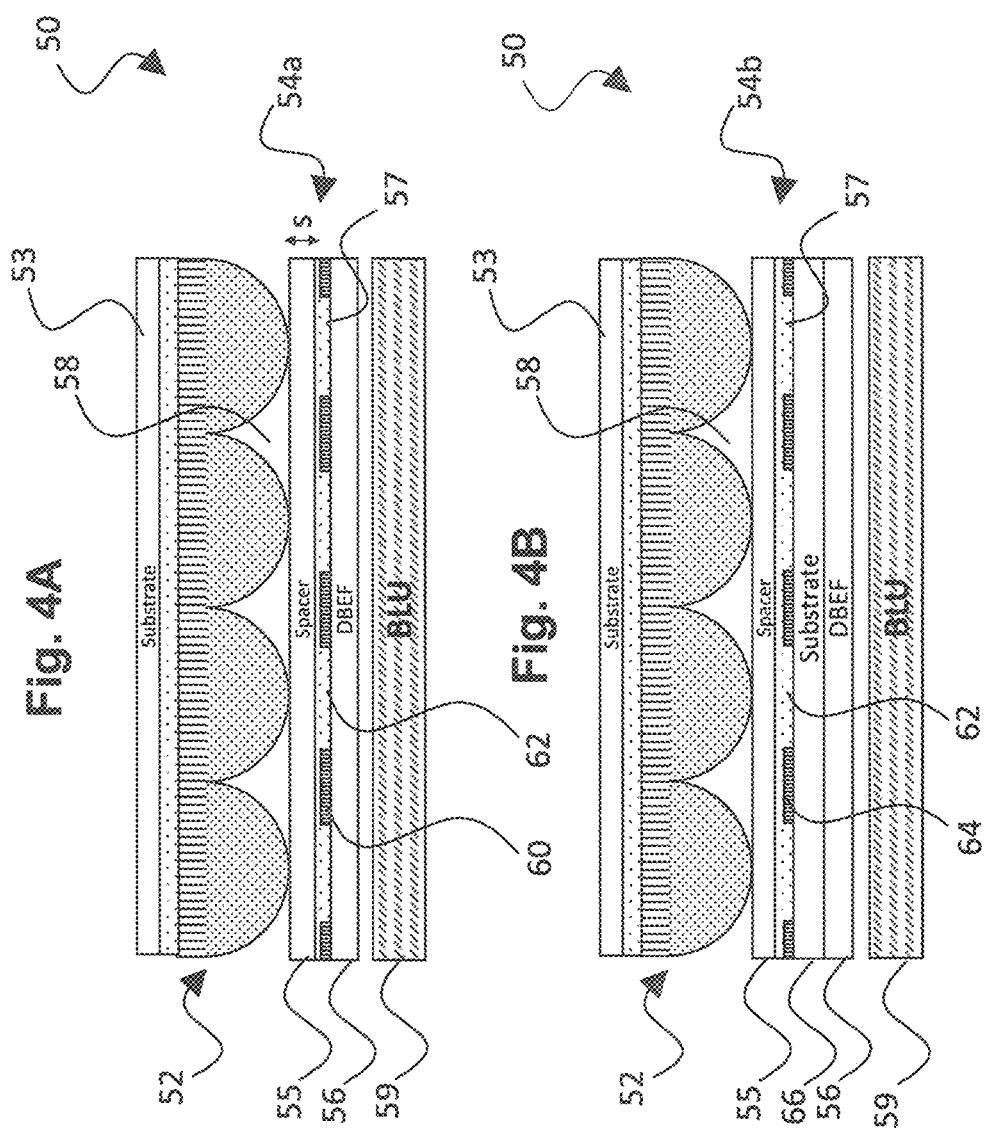

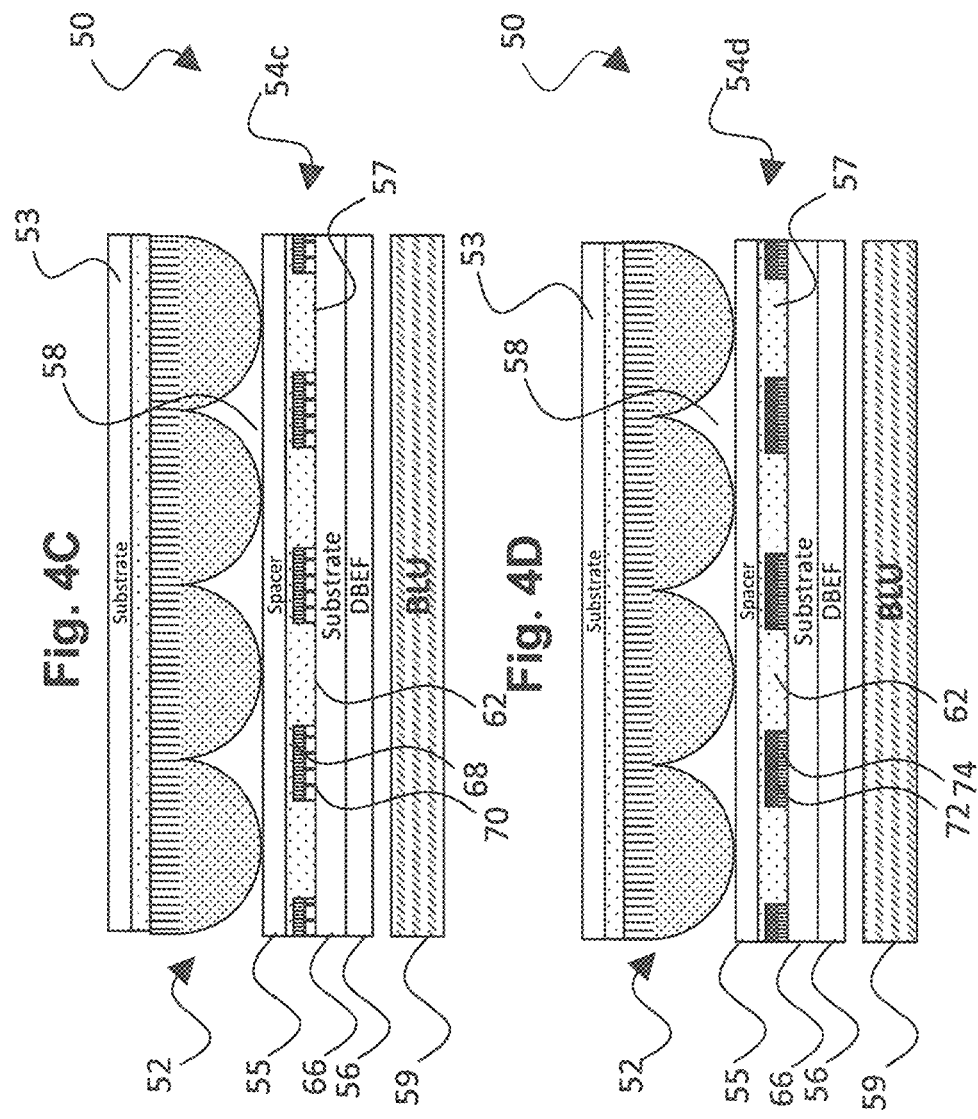

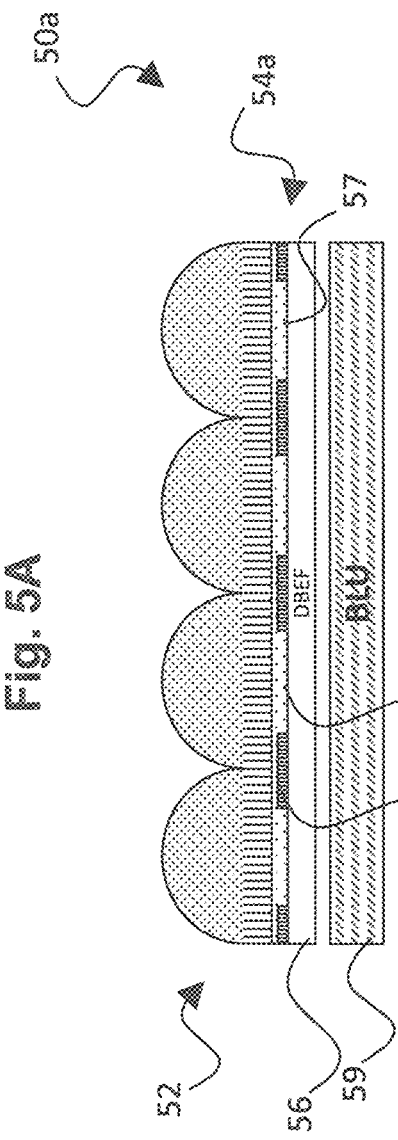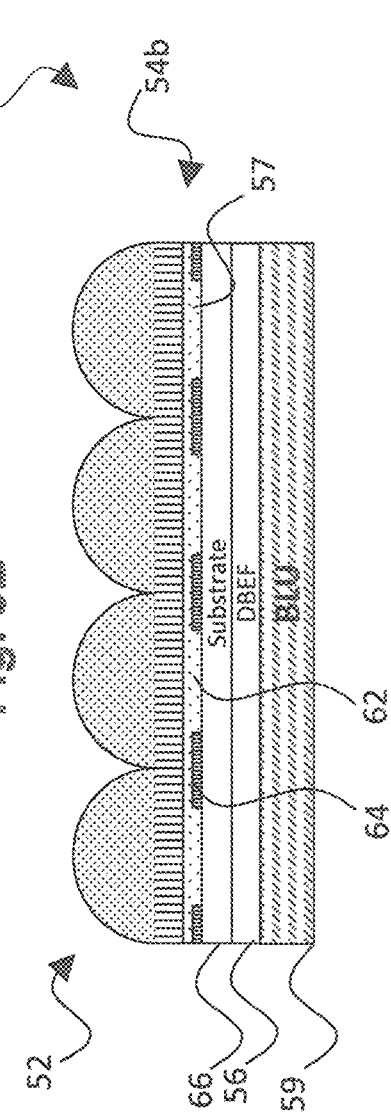

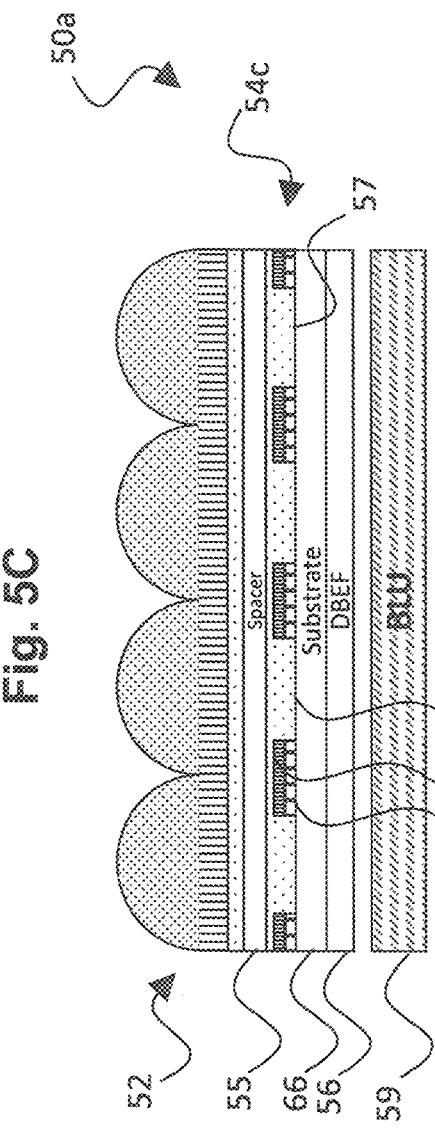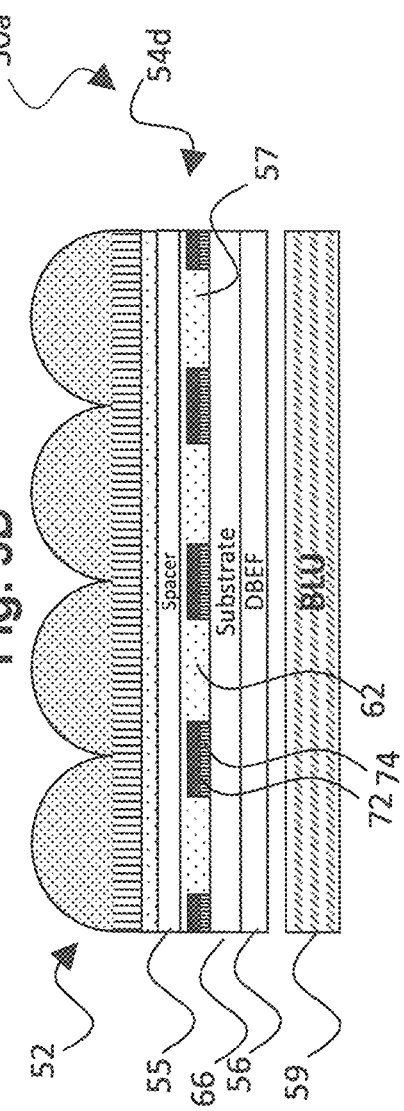

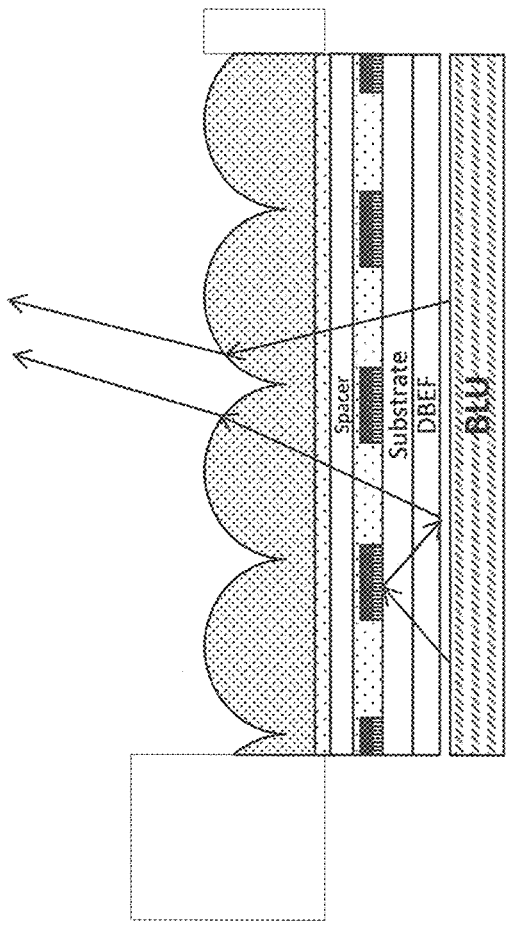
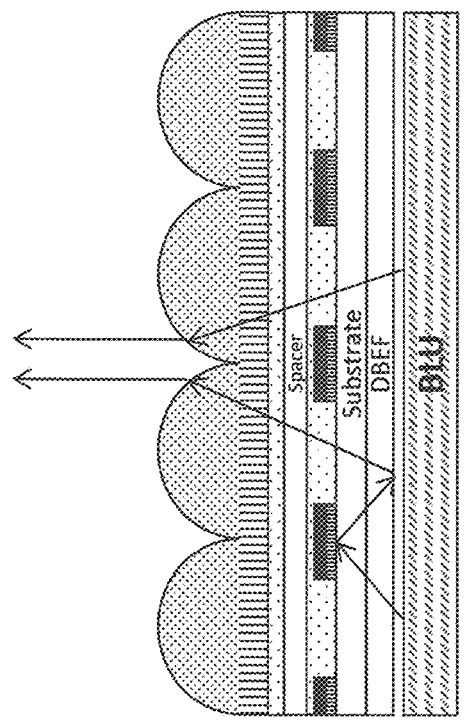
Fig. 6

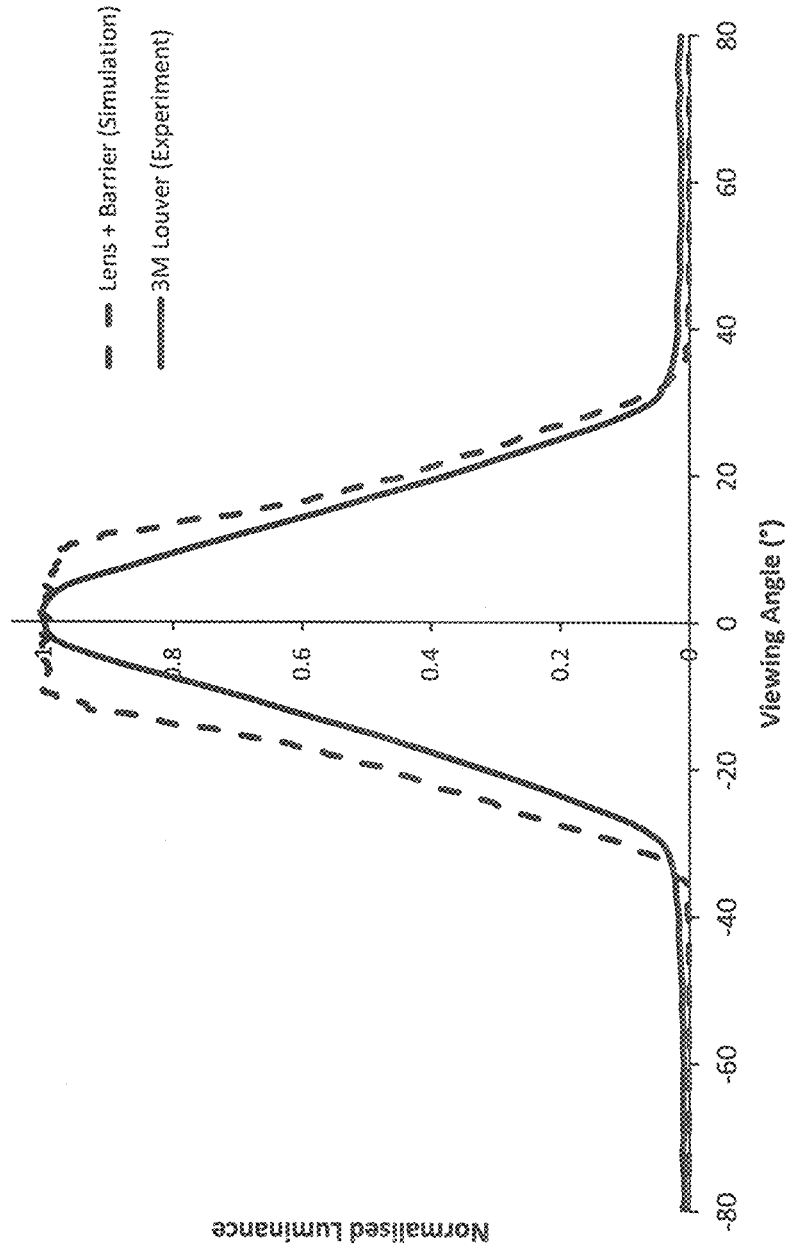

Measured data of black barrier vs reflective barrier

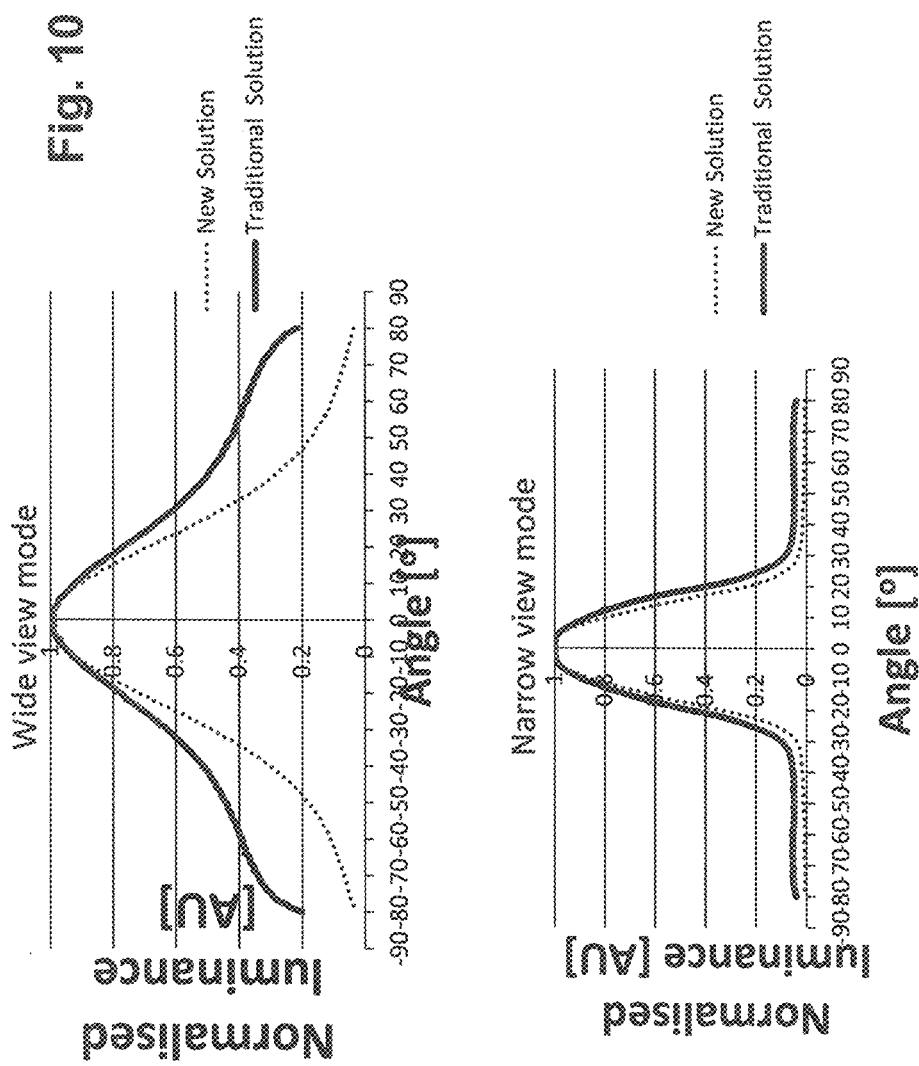

ENHANCED PRIVACY SWITCHABLE BACKLIGHT SYSTEM

TECHNICAL FIELD

The present invention relates to a switchable privacy display system for use, for example, as an automotive display involving a backlight system that is switchable between a strong privacy mode and a bright public mode.

BACKGROUND ART

Displays in automotive vehicles are becoming more and more prominent. There is a push for larger displays to become a common feature in cars including entertainment displays for the passenger. The main obstacle preventing this from becoming a reality is privacy: by law in many jurisdictions and otherwise for general safety concerns, a driver must not be able to view moving image content on a display while driving. Accordingly, if a passenger is watching video content on the dashboard display, no light (or no variation of light level) is to be visible from the driver's position. Such result necessitates a strong privacy display, by which image content is visible only from within a specific and limited viewing angle range, and otherwise generally is not visible to a viewer outside of such viewing angle range.

Accordingly, attempts have been made to provide display systems with a strong privacy mode. FIG. 1A is a schematic drawing depicting a liquid crystal device (LCD) configuration 10 as is conventional in the art. FIG. 1B is a schematic drawing depicting an LCD configuration 20 that is representative of an improved privacy display designed by Applicant, as described in Applicant's application Ser. No. 15/981,022 filed on May 16, 2018 (the '022 Application), the contents of which are incorporated herein by reference. In the conventional configuration 10, a backlight 12 emits light 14 to a view angle control film 16, and the light subsequently illuminates a liquid crystal display (LCD) image panel 18. The view angle control film may be a Louvre film as are known in the art. As illustrated by the arrows schematically illustrating the light beams 14, although there is some attenuation of off-axis light by the view angle control film 16, the screening of the off-axis light often is insufficient to provide a full private mode, as some residual off-axis light is still transmitted to the image panel 18 and thus to the viewing side (as indicated by the smaller arrows pointing in the off-axis direction). Accordingly, a strong private mode is not achieved as an image corresponding to the residual off-axis light still may be perceived by an off-axis viewer. Accordingly, the conventional configuration of FIG. 1A results in a privacy mode that in particular does not meet the stringent requirements for automotive applications.

In the LCD device 20 of FIG. 1B that is described in the '022 Application, an additional switchable view angle control LCD 22 is incorporated into the device. The switchable view angle control LCD 22 may be a switchable scattering LCD that can be electrically switched between a first mode (Mode 1 in FIG. 1B) and a second mode (Mode 2 in FIG. 1B). In the first mode (Mode 1), the switchable view angle control LCD 22 performs a view angle restriction function without scattering light to provide a narrow angle viewing or private mode. Comparing Mode 1 to the conventional configuration, the off-axis light that might not be screened out by the view angle control film 16 is now blocked by the switchable view angle control LCD 22. In this manner, an enhanced privacy mode is achieved as compared to conventional configurations. In the second mode (Mode 2), the switchable view angle control LCD 22 operates to perform a light scattering function to achieve a wide angle viewing or public mode.

Accordingly, the configuration of the '022 Application of FIG. 1B addresses the automotive industry need for a display system that can switch between a strong private mode and a public mode. As described in the '022 Application, one way of achieving switchable privacy is to have a switchable scatterer positioned above a privacy optic such as the above-mentioned Louvre film. For example, the '022 Application describes a hydrodynamic hybrid-aligned nematic (HHAN) cell that, in a first mode, enhances the privacy of the display device, and in a second mode, scatters the previously collimated light off-axis to provide the public mode. One drawback of this system, however, is that the light efficiency is low and the public mode can appear dim because a Louvre film generally has a low light efficiency, transmitting only about 35% of the light from a backlight. When the HHAN cell is placed in the scattering mode, the already low level of collimated light is scattered out to wider angles, which can result in a dim public mode.

SUMMARY OF INVENTION

There is a need in the art, therefore, for an enhanced switchable privacy display system by which a strong private mode is achieved, and additionally light is transmitted with enhanced efficiency by the privacy optic so that in both the private mode and the public scattering mode, the display system does not appear too dim. The present invention pertains to such an enhanced switchable privacy display system. Such a display system is suitable for automotive displays in which such a strong private mode is required, although principles of the present invention may be applied to any suitable switchable privacy display system.

In exemplary embodiments, the enhanced light efficiency is achieved using a backlight system that includes a reflective barrier and slit structure, in combination with a lens array. The lens array may be configured as a lenticular lens array having half-cylindrical lens elements, or a micro-lens array including a two-dimensional array of micro-lens elements. The lens array and the reflective barrier and slit structure may be configured to have a matching pitch. A switchable view angle control device is positioned on a viewing side of the backlight system to improve the privacy mode while maintaining a bright public mode. In exemplary embodiments, the switchable scattering device is configured as a hydrodynamic hybrid-aligned nematic (HHAN) cell, which in a first mode enhances the privacy of the display device, and in a second mode scatters the previously collimated light off-axis to provide the public mode.

An aspect of the invention, therefore, is a display component for controlling a viewing angle in a display system that achieves a strong private mode and enhanced brightness in the private and public modes as compared to conventional configurations. Another aspect of the invention is a display system that is operable in a narrow viewing angle private mode and a wide viewing angle public mode, wherein the display system includes the display component according to any of the embodiments in combination with an image panel. The display component includes a backlight unit that emits light from a non-viewing side of the display component toward a viewing side of the display component; a barrier and slit structure located on a viewing side of the backlight unit, the barrier and slit structure comprising a plurality of opaque barrier regions interspersed with a plurality of transparent slit regions; and a lens array of lens elements located on a viewing side of the barrier and slit structure, with the lens elements being located in a separate plane relative to the barrier regions, wherein the barrier and slit structure and the lens array operate to transmit light from the backlight unit collimated in a limited viewing angle range.

In exemplary embodiments of the display component, the barrier regions are reflective barrier regions that recycle light emitted from the backlight unit. For example, the barrier and slit structure may be formed of an enhanced spectral reflection film, and the slit regions are cut out from the film with the reflective barrier regions being the remaining film. The barrier and slit structure may be a patterned reflective metal layer deposited on a transparent substrate. The display component further may include a switchable scattering device located on a viewing side of the lens array, wherein the switchable scattering device is switchable between a non-scattering state that collimates light from the backlight unit, or has substantially no effect on the angular distribution of light, corresponding to a narrow viewing angle display mode, and a scattering state that scatters light from the backlight unit corresponding to a wide viewing angle display mode. The switchable scattering device may be a hydrodynamic hybrid aligned nematic (HHAN) liquid crystal cell.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

FIG. 1A is a schematic drawing depicting a liquid crystal device (LCD) configuration as is conventional in the art.

FIG. 1B is a schematic drawing depicting an LCD configuration that is representative of an improved privacy display previously designed by Applicant.

FIG. 2 is a schematic drawing depicting an exemplary barrier and slit structure including a side view and a top view.

FIG. 3A is schematic drawing depicting an exemplary lens array including a side view and a top view.

FIG. 3B is schematic drawing depicting another exemplary lens array including a side view and a top view.

FIG. 3C is a schematic drawing depicting a cross-sectional view showing cross-sectional dimensions of a lens element that may be included in the lens arrays of FIGS. 3A and 3B.

FIG. 3D is a schematic drawing depicting a variation on the lens arrays of FIGS. 3A and 3B, in which an opaque coating is incorporated between the lens elements.

FIGS. 4A, 4B, 4C, and 4D are schematic drawings depicting various configurations of a backlight system including an optical stack that combines a reflective barrier and slit structure with a lens array in accordance with embodiments of the present invention.

FIGS. 5A, 5B, 5C, and 5D are schematic drawings depicting alternative configurations of a backlight system including an optical stack that combines a reflective barrier and slit structure with a lens array in accordance with embodiments of the present invention.

FIG. 6 is a drawing depicting the light recycling function of a backlight system including an optical stack configured in accordance with embodiments of the present invention.

FIG. 7 is a graph depicting performance of a conventional Louvre film versus a lens and reflective barrier system that is configured in accordance with embodiments of the present invention.

FIG. 10 is graphs that include demonstrative results depicting a comparison of performance of a conventional display device configuration versus performance of a display device configuration using a HAN cell.

DESCRIPTION OF EMBODIMENTS

Figure 8B:
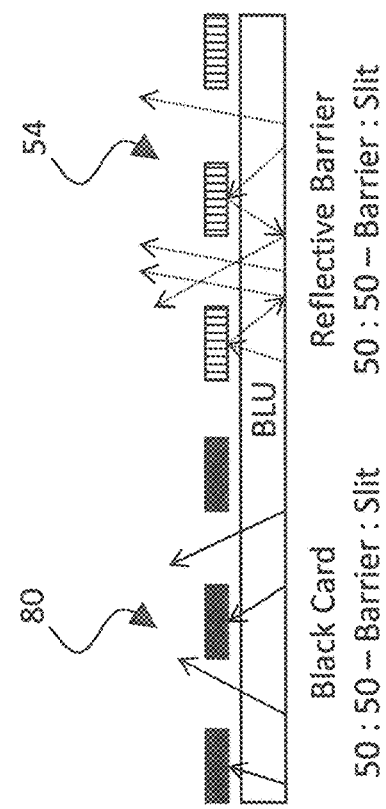
FIG. 8B is a drawing depicting the light transmission using the reflective barrier and slit structure of the present invention versus a conventional black card barrier system.

Embodiments of the present invention will now be described with reference to the drawings, wherein like reference numerals are used to refer to like elements throughout. It will be understood that the figures are not necessarily to scale.

The present invention pertains to an enhanced switchable privacy display system by which a strong private mode is achieved, and additionally light is transmitted with enhanced efficiency by the privacy optic so that in both the private mode and the public scattering mode, the display system does not appear too dim. Such a display system is suitable for automotive displays in which such a strong private mode is required, although principles of the present invention may be applied to any suitable switchable privacy display system.

In exemplary embodiments, the enhanced light efficiency is achieved using a backlight system that includes a reflective barrier and slit structure, in combination with a lens array. The lens array may be configured as a lenticular lens array having half-cylindrical lens elements, or a micro-lens array including a two-dimensional array of micro-lens elements. The lens and the reflective barrier and slit structure may be configured to have a matching pitch. A switchable scattering device may be positioned on a viewing side of the backlight system to enable switching between private and public modes. In exemplary embodiments, the switchable scattering device is configured as a hydrodynamic hybrid-aligned nematic (HHAN) cell to provide a strong private mode for automotive applications, which in a first mode enhances the privacy of the display device, and in a second mode scatters the previously collimated light off-axis to provide the public mode.

Reflective Barrier Structure and Lens Array

One method for achieving good privacy performance is to use a slit and barrier structure and a lens array. FIG. 2 is a schematic drawing depicting an exemplary barrier and slit structure 30 including a side view and a top view. As seen in the side view, the barrier and slit structure 30 may include opaque barrier regions 32 interspersed with transparent slit regions 34, with the opaque barrier regions being formed on a substrate 36 that is a transparent material such as glass to form the slits. A pitch P. barrier of the barrier and slit structure 30 is defined as the combined slit width and barrier width. A slit may have a width comparable to or the same as the width of an adjacent barrier, or the slit width may be less than or greater than the barrier width. It may be beneficial for the slit:barrier width ratio to be in the range of 20:80≤slit:barrier≤70:30, preferably in the range of 30:70≤slit:barrier≤60:40 or in the range of 40:60≤slit:barrier≤50:50. As seen in the top view portion of FIG. 2, in a barrier and slit configuration 30a the barriers can be arranged in parallel barrier strips 32a with parallel slits 34a interspersed between the barriers (1D version). Alternatively, in a barrier and slit configuration 30b the barriers can be arranged as a barrier grid 32b with apertures 34b interspersed within the grid acting as the slits (2D version). The apertures may be any shape such as square, rectangular, circular or elliptical. The barrier and slit pitch may vary across the structure, or the pitch may be consistent across the structure. The barrier and slit structure may be a film whereby the slits have been cut out, or the structure may have been patterned onto a substrate, with variations described in more detail below.

FIGS. 3A and 3B are schematic drawings depicting exemplary lens arrays 40 and 41 each including a side view and a top view. The lens arrays 40/41 include an array of lens elements 42 deposited on a transparent substrate 44. In the configuration of lens array 40, the lens elements 42 are positioned adjacent to each other with essentially no gaps between the lens elements. In the configuration of lens array 41, the lens elements 42 are positioned with gaps 43 present between adjacent lens elements.

As seen in the top views, the lens arrays 40 and 41 may be configured as a lenticular lens array 40a or 41a (1D version) configured as strips of lens elements 42a formed as near half-cylinder lens elements, which in the configuration of lens array 41a further includes gaps 43a oriented as parallel strips between the lens elements 42a. Alternatively, the lens arrays 40 and 41 may be configured as a micro-lens array 40b or 41b (2D version) configured as a two-dimensional array of near half sphere lens elements 42b, which in the configuration of lens array 41b further includes gaps 43b oriented as a grid of gaps running between the lens elements 42b.

FIG. 3C is a schematic drawing depicting a cross-sectional view showing cross-sectional dimensions of a lens element 42 that may be included in the lens arrays of FIGS. 3A and 3B. Referring to such figures, the lens elements have a pitch P, a height H, a width W, and may have an angle from semicircle/sphere θ as a deviation parameter. In the embodiments including the gaps 43, the pitch is the sum of the lens width and the gap width. The pitch may be uniform across the lens array or may vary across the array. For a lens and barrier system, it may be desirable that the lens elements have a strong focusing power. The closer the lens elements are to exact half-cylinders or half-spheres, the stronger the lens elements will be. For a lens and barrier system for use in a privacy display, it is desirable that the ratio of Pitch/Height (P/H) of the lens elements is in the range 5≥P/H≥2. More preferably, the ratio P/H is in the range 3≥P/H≥2, or in the range 2.5≥P/H≥2. Current lenticular fabrication techniques are unable to fabricate exact semicircle or spherical lenses, but are able to create an array with lens elements that have a deviation parameter of θ≥3°. Lens elements can be made stronger by using a high refractive index material. The lens materials may have a refractive index of n>1.45, and preferably n>1.50 or n>1.55. It may be desirable that the lens elements are made out of a low to negligible birefringence resin. The lens elements may be fabricated on a substrate that also has low to negligible birefringence. A high birefringence material substrate could be used in some applications, but this may cause unwanted optical effects unless additional polarizer optics are carefully aligned to counteract such effects.

FIG. 3D is a schematic drawing depicting a variation on the lens arrays 40/41 of FIGS. 3A and 3B, in which an opaque, light absorbing coating 45 is incorporated between the lens elements 42. The light absorbing coating 45 may be deposited between the lens elements 42 as a means of blocking out any light leakage. The light absorbing material may be a black material such as a black emulsion, black chrome, or black ink. The left portion of FIG. 3D shows the lens array 40 with the light absorbing material 45 deposited in the interstitial grooves between the lens elements 42. The right portion of FIG. 3D shows the lens array 41 with the light absorbing material deposited in the gaps 43 between the lens elements 42. One method of depositing a black material in between the lens elements is to spin-coat black ink onto the lens array which allows the ink to flow into the grooves.

In exemplary embodiments of the present invention, an enhanced backlight system may include barrier and slit structure combined with a lens array to form an optical stack that may be used to provide for enhanced private and public viewing modes in a switchable privacy display system. Generally, a 1D version of barrier and slit structure 30a (parallel strip barriers/slits) may be combined with a lenticular lens array 40a/41a (half-cylinder lens elements). Similarly, a 2D version of barrier and slit structure 30b (grid barrier with aperture slits) may be combined with a micro lens array 40b/41b (half-spherical lens elements).

An aspect of the invention, therefore, is a display component for controlling a viewing angle in a display system that achieves a strong private mode and enhanced brightness in the private and public modes as compared to conventional configurations. The display component includes a backlight unit that emits light from a non-viewing side of the display component toward a viewing side of the display component; a barrier and slit structure located on a viewing side of the backlight unit, the barrier and slit structure comprising a plurality of opaque barrier regions interspersed with a plurality of transparent slit regions; and a lens array of lens elements located on a viewing side of the barrier and slit structure, with the lens elements being located in a separate plane relative to the barrier regions, wherein the barrier and slit structure and the lens array operate to transmit light from the backlight unit collimated in a limited viewing angle range. In exemplary embodiments of the display component, the barrier regions are reflective barrier regions that recycle light emitted from the backlight unit.

FIGS. 4A-4D are schematic drawings depicting various configurations of a backlight system including an optical stack that combines a reflective barrier and slit structure with a lens array. In the examples of FIGS. 4A-4D, the convex side of the lens elements faces toward the barrier and slit structures and thus toward the non-viewing side. The precise configuration of the barrier and slit structure differs with respect to each of the embodiments of the backlight systems of FIGS. 4A-4D.

In the various embodiments of FIGS. 4A-4D, a backlight system 50 is configured as an optical stack that includes a lens array 52 that may be configured in accordance with any of the configurations as described with respect to FIGS. 3A and 3B. The lens array 52 is deposited on a transparent substrate 53, which may be glass or other suitable transparent material usable in displays. With the orientation of the convex side of the lens elements facing toward the barrier and slit structures, an additional substrate 53 gives the lens array desirable rigidity. The lens array 52 is positioned on a viewing side of a barrier and slit structure 54 (a, b, c, or d), with the differences in such structures being described in more detail blow. A spacer 55 may be employed to locate the lens array 52 at an optimal distance relative to the barrier and slit structure. The barrier and slit structure 54 (a, b, c, or d) may be deposited on the viewing side of a brightness enhancement film 56, such as a dual brightness enhancement film (DBEF). The spacer, barrier and slit configuration, and DBEF may be adhered to each other using a suitable optically transparent glue 57. The combination of spacer and glue layer is chosen as optimal for any particular application, and generally glue layer may be very thin, and all glue layers preferably have a refractive index matching adjacent substrates or layers.

The total separation "s" (see FIG. 4A) between the apex of the lens array and the plane of the barrier and slit structure may be optimized depending on the pitch and height of the lens elements. Accordingly, the lens elements of the lens array are located in a separate plane relative to the barrier regions of the barrier and slit structure. In general, it may be desirable for the ratio of the pitch P to the separation s to be in the range of $5 \geq P/s \geq 1$. More preferably, the ratio is in the range of $3.5 \geq P/s \geq 1.2$ or in the range of $2.7 \geq P/s \geq 1.5$. The spacing between the lens elements may be filled with a low refractive index medium 58, and power of the lenses is maximized if the low refractive index medium is air or a vacuum. The optical stack 50 further includes a backlight unit 59 (BLU) located on a non-viewing side of the optical stack to act as a light source that emits light from the non-viewing side of the optical stack toward the viewing side of the optical stack.

In exemplary embodiments, the barrier and slit structure includes a reflective material that forms the barrier regions, which may be configured in a variety of ways. In the embodiment of FIG. 4A, the barrier and slit structure 54a is formed from a reflective film, such as for example an enhanced spectral reflection (ESR) film. When employing such a film, slits 62 may be cut out from the film with the barrier regions 60 being the remaining film, or the film may be manufactured to contain the slits between the barriers. In the embodiment of FIG. 4B, the barrier and slit structure 54b is configured to have reflective metal barrier regions 64, such as aluminium or silver barriers. The reflective barrier and slit structure 54b may be fabricated by depositing a reflective metal material such as aluminium or silver onto a transparent substrate 66 to form a patterned metal layer on the substrate with the slits 62 positioned between the metal barrier regions. The substrate 66 may be an optically transparent material such as glass. In the embodiment of FIG. 4C, the barrier and slit structure 54c is formed using silver to form patterned reflective metal barrier regions 68. When employing silver barriers, it is beneficial first to deposit an additional patterned adhesion layer 70 on the substrate 66 to enable stronger adhesion of the patterned silver barrier regions 68 to the substrate. This additional patterned adhesion layer 70 may be an optically thin layer of chrome. As shown in the embodiment of FIG. 4D, to reduce reflections off the top surface of the reflective barriers, a patterned light absorbing material layer 72 may be deposited on the viewing side of reflective barrier regions 74, with the reflective barrier regions 74 being configured according to any of the embodiments. The absorbing material of the light patterned absorbing layer 72 may be a black mask, a black emulsion, black chrome, or any other suitable low reflection material. In the various embodiments, the barrier-slit pattern also may be created by etching away the desired areas of reflective material via photolithography.

FIGS. 5A-5D are schematic drawings depicting alternative configurations of a backlight system 50a, which also is configured as an optical stack that combines a reflective barrier and slit structure with a lens array. These embodiments are comparable to the embodiments of FIGS. 4A-4D, except that in the examples of FIGS. 5A-5D, the convex side of the lens elements faces away from the barrier and slit structure and thus toward the viewing side. In other respects, the embodiments are generally comparable. With the orientation of FIGS. 5A-5D, the lens array substrate may be thick enough to space the lens elements at the desired distance from the barriers, which obviates the need for an additional spacer. Alternatively, the spacer 55 (see FIGS. 5C and 5D) still may be used to achieve the desired separation in combination with a thin layer of glue.

Reflective barriers as described in the various embodiments operate to recycle the light that does not pass through the slits, comparable to a DBEF film recycling polarized light, to boost the amount of light transmitted when placed on a viewing side of the backlight. Using a material with high reflectivity in the visible light range increases the amount of light that is recycled. Comparative measurements of a barrier and slit structure on a backlight show that a highly reflective material such as silver allows for over 80% of the light to be transmitted, as compared to a barrier made out of a black absorbing material which allows for only 35% of light to be transmitted. A Louvre film also only transmits about 35% of light from a backlight. A reflective barrier system, therefore, is advantageous in achieving enhanced light transmission within a privacy display system.

As referenced above, in a lens array and reflective barrier backlight system, the barrier and slit structure is positioned on a viewing side of the backlight, and the lens array is positioned on a viewing side of the barrier and slit structure. It may be desirable that the pitch of the lens array matches the pitch of the barrier and lens structure so that the optical effect is uniform across the backlight system. It may be desirable that there is a small difference in pitches between the lens array and the barrier and slit structure so that optical effect varies across the backlight system. This may be useful in large displays so that light from the outside of the display gets directed towards the center viewing region of the display. In general, it is desired that the ratio between lens pitch and barrier pitch for any neighbouring lens and barrier elements be in the range $0.9 \leq$ pitch ratio $\leq 1.1$. For the lens elements to have strong focusing power, there is a large difference in refractive index between the lens array structure and the surrounding medium. Focusing power is strongest when the surrounding medium is air or a vacuum, i.e. the lens array should not be glued to the barrier and slit structure. The DBEF film or other brightness enhancement film may be placed within the optical stack as referenced above, and the DBEF may be most effective when positioned in between the viewing side surface of the BLU and the reflective barriers.

FIG. 6 is a drawing depicting the light recycling function of the backlight system configured in accordance with embodiments of the present invention. FIG. 6 illustrates how a position of the lens elements relative to the barriers and slits affects the direction in which the light is collimated in a narrow or specific viewing angle range. Generally, as shown in the left side portion of FIG. 6, with the centers of the lens elements aligned with the slits, the light is collimated on-axis or perpendicular to the lens array. As shown in the right side portion of FIG. 6, with the centers of the lens elements misaligned with the slits, the light is collimated off-axis relative to the lens array. It will be appreciated the FIG. 6 is illustrative of the overall effect and the exact ray optics may differ. Although FIG. 6 depicts an example using the embodiment of the optical stack of FIG. 5D, comparable principles apply to any of the embodiments. Accordingly, the viewing angle direction of the collimated light can be selected based on the positioning of the lens array relative to the barrier and slit structure, and in particular based on the positioning of the centers of the lens element relative to the slits.

Accordingly, with a lens array and reflective barrier system positioned on the viewing side of a backlight unit, the slits create apertures for the light to be transmitted through. The reflective barriers recycle light that does not pass through the slit apertures in a first pass from the backlight unit, and the lens array focuses or collimates the light that passes through the slit apertures in a particular direction. For a near half-cylinder lenticular or half-sphere micro lens array, the direction in which the light is collimated is dependent on the position of the lens elements relative to the slits. If the center of a lens element is positioned above the center of a slit, then the light will be collimated in a direction perpendicular to the surface of the lens array which corresponds to on-axis collimation (FIG. 6, left portion). If the center of a lens element is not directly above the center of a slit, then the collimation direction will not be perpendicular to the surface of the lens array which corresponds to off-axis collimation (FIG. 6, right portion). Such operation can be used to create a display system with either symmetric privacy or asymmetric privacy modes. Asymmetric privacy may also be achieved by using variations in the shape of the lens elements rather than half cylinder or half-sphere lens elements.

FIG. 7 is a graph depicting performance of a conventional Louvre film versus a lens and reflective barrier system that is configured in accordance with embodiments of the present invention. In this example, the lens array and reflective barrier and slit structure are configured to provide on-axis collimation. Both configurations provide for a strong privacy mode with limited off-axis viewing at viewing angles beyond ±40° relative to center. However, within the on-axis desired viewing angle of ±40°, the lens and reflective barrier system of the present invention achieves substantially greater luminance as compared to Louvre films due to the light recycling that is performed by the lens and reflective barrier system as described above.

Figure 8A:
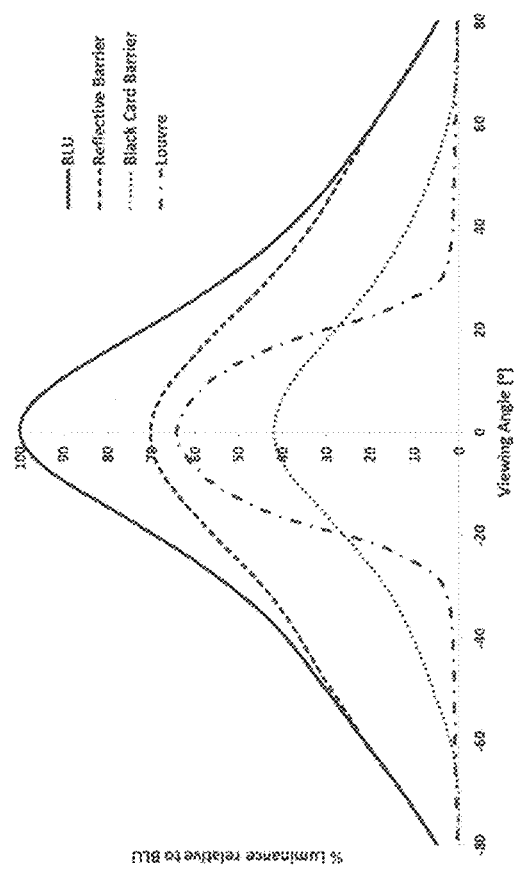
FIG. 8A is a graph depicting luminance performance for the reflective barrier and slit structure of the present invention as compared to a conventional Louvre film and a conventional black card barrier system.

The enhanced performance of the lens and reflective barrier system of the present invention further is illustrated in FIGS. 8A and 8B. In particular, FIG. 8A is a graph depicting luminance performance for the reflective barrier and slit structure of the present invention as compared to a conventional Louvre film and a conventional black card barrier system. FIG. 8B is a drawing depicting the light transmission using the reflective barrier and slit structure 54 of the present invention versus a conventional black card barrier system 80. The graph shows that a reflective barrier and slit structure transmits over 80% of light from the BLU, as compared to 35% transmitted by a black card barrier equivalent and 35% transmitted by a Louvre film. In practice, a black card configuration would not be used in an actual device, but is employed herein as a black carrier equivalent for illustrative purpose to show the enhanced effects of the present invention. In devices, a black barrier would conventionally be made using an absorbing material such as a black emulsion. As shown in FIG. 8B, the enhancement occurs due to the light recycling performed by the reflective barrier and slit structure 54, which is not performed by the black card barrier system 80. The enhanced luminance using reflective barrier and slit structure 54 of the present invention results in a stronger private mode and a brighter public mode as compared to conventional configurations, as further detailed below.

Lens and Reflective Barrier Combined With HHAN

Figure 9A:
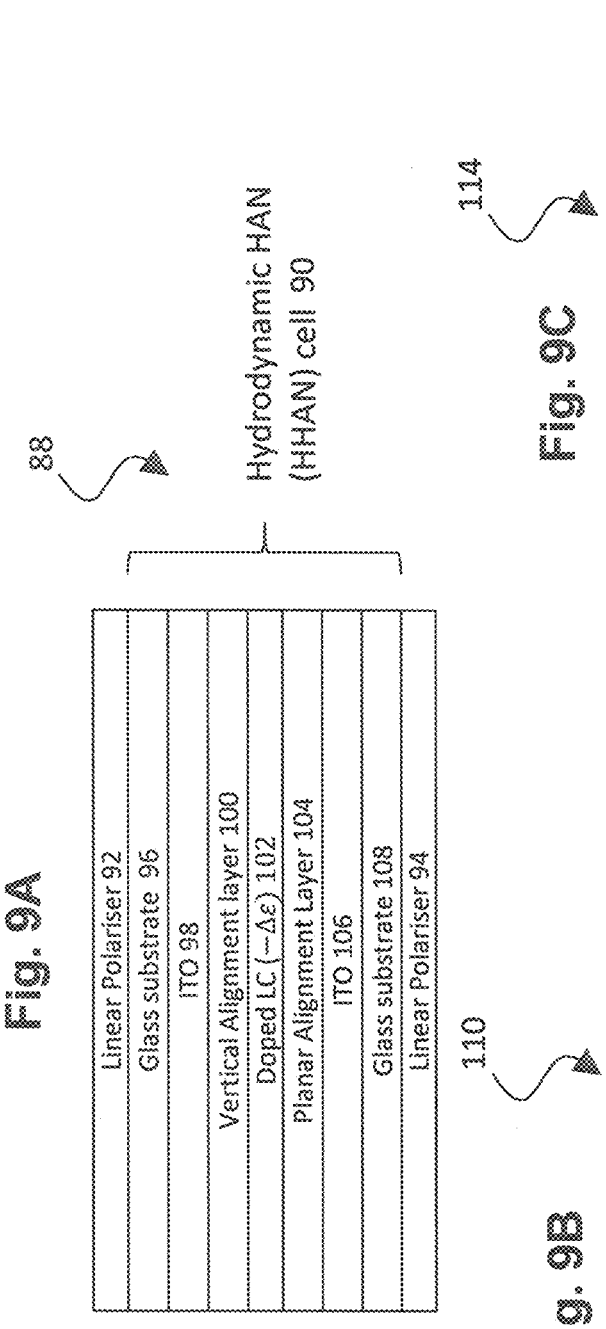
FIG. 9A is a schematic drawing depicting an exemplary display component including a view angle control HHAN cell that is located between a front (viewing side) polarizer and a rear (non-viewing side) polarizer.

As described in Applicant's '022 Application, which as referenced above is incorporated herein by reference, a hydrodynamic hybrid aligned nematic (HHAN) LCD cell can be used to provide increased privacy in a display device and to perform a light scattering function. FIG. 9A is a schematic drawing depicting an exemplary display component 88 including a view angle control HHAN cell 90, that is located between a front (viewing side) polarizer 92 and a rear (non-viewing side) polarizer 94. In general, the HHAN cell may 90 include the following components ordered from the viewing side as follows: a first electrode substrate 96 (which may be glass), a first electrode layer 98 (which may be indium tin oxide (ITO)), a first LC alignment layer 100 which may be a vertical alignment layer, a switchable doped liquid crystal LC layer 102, a second alignment layer 104 which may be a planar alignment layer, a second electrode layer 106 (which also may be ITO), and a second electrode substrate 108 (which also may be glass). The light scattering function is enabled by doping the LC layer. The configuration of FIG. 9A is representative of a HHAN cell, and variations and additional details are described in the '022 Application.

FIG. 10 are graphs that include demonstrative results depicting a comparison of performance of a conventional display device configuration ("Traditional Solution") versus performance of a display device configuration using a HHAN cell ("New Solution"). Such figure further corresponds to FIG. 12 of the '022 Application. Luminance is presented as a function of viewing angle for both a narrow angle viewing mode and a wide angle viewing mode. The conventional configuration used with respect to FIG. 10 is comparable to the configuration depicted in FIG. 1A, with the optical system including a combination of a Louvre film and a scattering layer. As shown in the top portion of FIG. 10, a HHAN cell may have somewhat lower luminance at wider angles in the wide angle view mode, which in practice does not correspond to any significant reduction in image quality to a viewer. As shown in the bottom portion of FIG. 10, however, the HHAN cell provides an enhanced narrow angle view mode with stronger privacy. In the narrow angle view mode, for off-axis angles greater than about 30°, the HHAN cell has lower transmission, i.e. stronger privacy, than the conventional configuration. Even with the difference level depicted in the bottom graph of FIG. 10 at wider angles, an image would still tend to be visible to an off-axis viewer with the conventional configuration. In contrast, even a faint image would not be visible to an off-axis viewer using configurations employing a HHAN cell. Accordingly, the HHAN cell outperforms the conventional configuration in a significant manner in providing enhanced privacy in the narrow angle view mode.

A display component of the present invention, therefore, further may include a switchable scattering device located on a viewing side of the lens array, wherein the switchable scattering device is switchable between a non-scattering state that collimates light from the backlight unit corresponding to a narrow viewing angle display mode, and a scattering state that scatters light from the backlight unit corresponding to a wide viewing angle display mode. The switchable scattering device may be a hydrodynamic hybrid nematic (HHAN) liquid crystal cell.

Figure 9B:
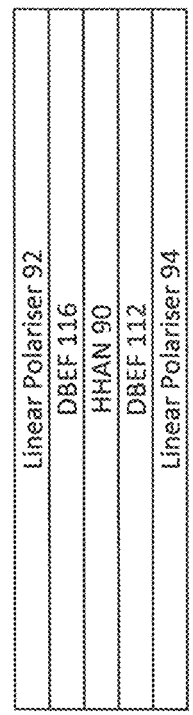
FIG. 9B and FIG. 9C are drawings depicting exemplary display components including an HHAN cell and one or more additional polarizers and DBEFs.

Referring back to FIG. 9A, when doped with an ionic dopant, the LCD layer 102 can be switched into a scattering mode via the electro-hydrodynamic effect. The resultant hydrodynamic HAN LCD (HHAN) 90 can therefore be used to enhance the privacy of a collimated light source in one mode and then scatter that collimated light in a second mode. As illustrated in FIG. 9A, to operate in a privacy mode using an HHAN cell, polarizers 92 and 94 are located on the viewing and non-viewing sides of the HHAN cell 90. As depicted in FIG. 9B, a display component 110 further may include a first DBEF 112 in between the rear polarizer 94 and the HHAN cell 90, which can boost brightness in the scattering mode. In addition, as depicted in FIG. 9C, a display component 114 further may include a second DBEF 116 in between the front polarizer and the HHAN cell 90, which can boost brightness even further in the scattering mode.

As detailed above, the problem with the conventional Louvre film is that the Louvre film absorbs too much light, and thus the public mode is very dim when that light is scattered by the HHAN. When the Louvre film is replaced by a lens and reflective barrier backlight system in accordance with embodiments of the present invention, then the private and public modes are substantially brighter as illustrated, for example, in the graphs of FIGS. 7 and 8. Accordingly, the lens and reflective barrier backlight system can be incorporated into a display system to provide a strong privacy mode in combination with a substantially bright public mode as compared to conventional configurations.

Figure 11:
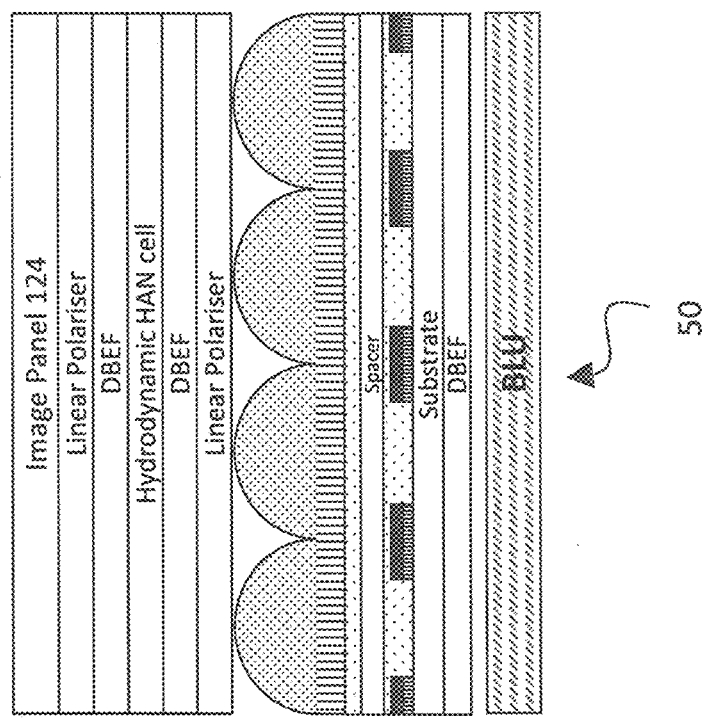
FIG. 11 is a schematic drawing depicting an exemplary display system in accordance with embodiments of the present invention.

FIG. 11 is a schematic drawing depicting an exemplary display system 120 in accordance with embodiments of the present invention. The display system 120 includes a switchable scattering device 122 and an image panel 124, positioned a viewing side of the backlight system 50 including a lens array and reflective barrier system 54 in accordance with embodiments of the present invention. Although FIG. 11 depicts an example using the embodiment of the optical stack arrangement of FIG. 5D, comparable principles apply to any of the embodiments of the backlight system which similarly may be incorporated into a display system. The switchable scattering device 122 may be switched between a narrow viewing angle mode for transmitting in a strong privacy mode, and a wide viewing angle mode for transmitting in a public mode. Various configurations of switchable scattering devices likewise are described in Applicant's '022 Application.

Figure 9C:
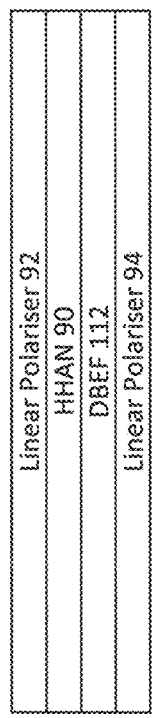
Figure 12:
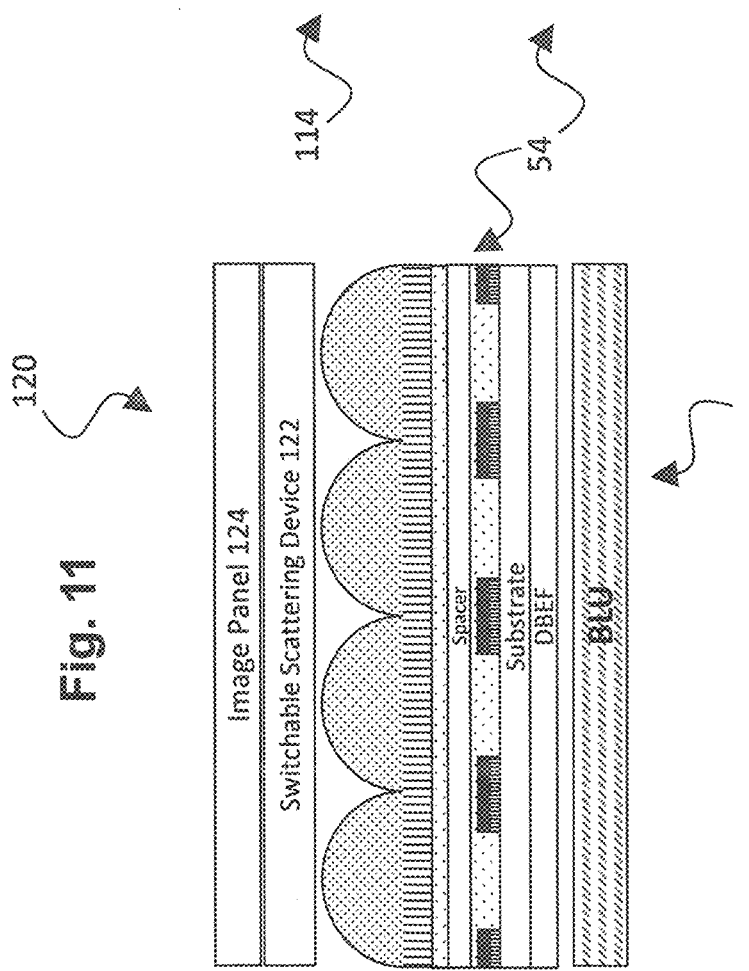
FIG. 12 is a schematic drawing depicting an exemplary embodiment of the display system of FIG. 11, in which the switchable scattering device includes an HHAN cell.

FIG. 12 depicts a specific example of a display system 130 in accordance with embodiments of the present invention, in which the switchable scattering device is configured as the display component 114 of FIG. 9C (and similarly other display component embodiments such as FIGS. 9A and 9B may be employed). In such configuration the switchable scattering device includes the switchable HHAN cell to provide switching between the private and public modes. The HHAN cell may have laminated onto it any combination of the rear linear polarizer, first DBEF, second DBEF, and front linear polarizer as illustrated in FIGS. 9A-9C. When the image panel is an LCD, then the front polarizer may not be needed, and the privacy enhancement of the HHAN cell also may be strong enough without the rear polarizer. DBEFs laminated onto the HHAN may be omitted to improve privacy performance at the cost of public mode brightness. In the privacy mode the lens and reflective barrier backlight system provides a very bright private state, and the HHAN LCD strengthens the privacy. In the public mode the HHAN is switched to a scattering mode that scatters the collimated light from the lens and reflective barrier backlight system to give a public mode with enhanced brightness as a result of the enhanced efficiency of the lens and reflective barrier backlight system. Other examples of switchable scattering devices include a polymer dispersed liquid crystal (PDLC), and a hydrodynamic electrically controlled birefringence (ECB) or a hydrodynamic vertically aligned nematic (VAN) LC cell both of which can also enhance privacy as described in the '022 Application.

Figure 13:
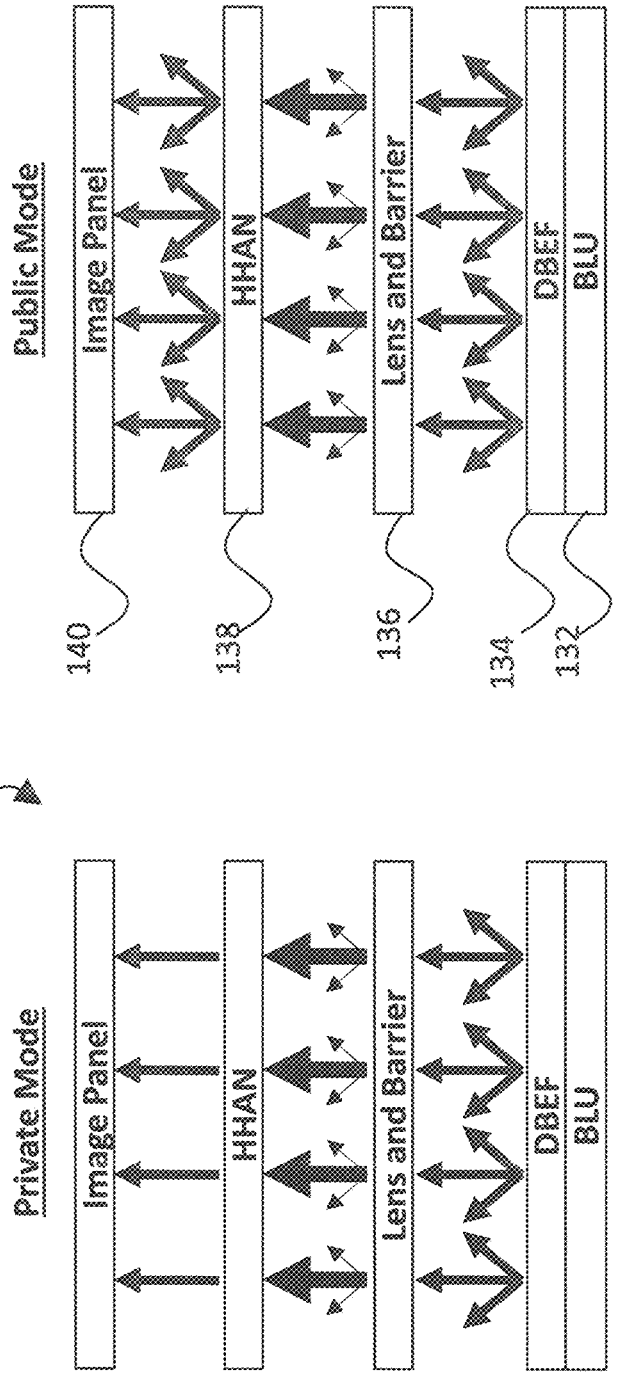
FIG. 13 is a schematic drawing depicting operation of a display system in accordance with embodiments of the present invention, including operation in both a private mode and a public mode.

FIG. 13 is a schematic drawing depicting operation of a display device 131 in accordance with embodiments of the present invention, including operation in both a private mode and a public mode. In this example, a backlight unit 132 emits light to a brightness enhancing film such as a DBEF 134. The light passes through a lens array and reflective barrier system 136, configured in accordance with any of the embodiments. The light then passes through a switchable scattering device such as an HHAN cell 138, which also may be configured in accordance with any of the embodiments. The light subsequently illuminates a liquid crystal display (LCD) image panel 140.

Figure 14:
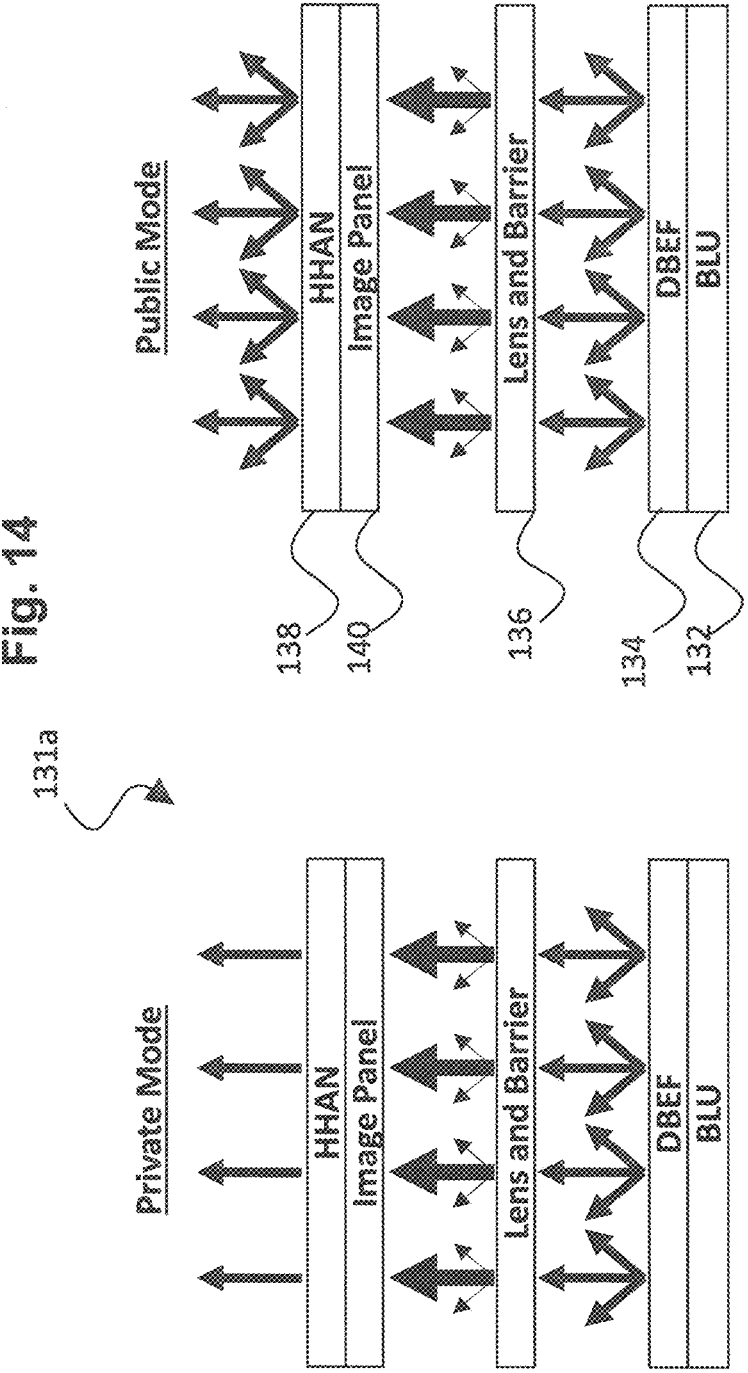
FIG. 14 is a schematic drawing depicting operation of another display system in accordance with embodiments of the present invention, including operation in both a private mode and a public mode.

In both the private and public modes, the lens array and reflective barrier system 136 operates to transmit light predominantly in a narrow viewing angle range (e.g., on-axis), and with increased luminance in such viewing angle range as compared to conventional configurations which enables a strong private mode. When operating in such private mode, the HHAN cell is switched to a narrow viewing angle mode so as to transmit light only within the narrow viewing angle range (e.g., on axis). Any residual off-axis light that may be transmitted through the lens array and reflective barrier system 136 is further attenuated by the HHAN cell, so as to enhance the viewing angle limitation of the private mode for enhanced privacy. When operating in the public mode, the HHAN cell is switched to a wide viewing angle mode so as to transmit light within a broad viewing angle range. Furthermore, because of the enhanced brightness of light transmitted by the lens array and reflective barrier system 136 as compared to conventional configurations, the public mode appears brighter as compared to conventional configurations. FIG. 14 illustrates an exemplary embodiment of a display system 131a that operates comparably as the embodiment of FIG. 13, and further illustrates that the HHAN cell alternatively can be located on the viewing side of the image panel 140 rather than on the non-viewing side as in FIG. 13.

An aspect of the invention, therefore, is a display component for controlling a viewing angle in a display system that achieves a strong private mode and enhanced brightness in the private and public modes as compared to conventional configurations. In exemplary embodiments, the display component includes a backlight unit that emits light from a non-viewing side of the display component toward a viewing side of the display component; a barrier and slit structure located on a viewing side of the backlight unit, the barrier and slit structure comprising a plurality of opaque barrier regions interspersed with a plurality of transparent slit regions; and a lens array of lens elements located on a viewing side of the barrier and slit structure, with the lens elements being located in a separate plane relative to the barrier regions, wherein the barrier and slit structure and the lens array operate to transmit light from the backlight unit collimated in a limited viewing angle range. The display component may include one or more of the following features, either individually or in combination.

In an exemplary embodiment of the display component, the barrier regions are reflective barrier regions that recycle light emitted from the backlight unit.

In an exemplary embodiment of the display component, the barrier and slit structure comprises an enhanced spectral reflection film, and the slit regions are cut out from the film with the reflective barrier regions being the remaining film.

In an exemplary embodiment of the display component, the barrier and slit structure comprises a patterned reflective metal layer deposited on a transparent substrate.

In an exemplary embodiment of the display component, the patterned reflective metal layer is made of silver or aluminium.

In an exemplary embodiment of the display component, the barrier and slit structure further comprises a patterned light absorbing material deposited on a viewing side of the reflective barrier regions.

In an exemplary embodiment of the display component, the barrier regions and slit regions are parallel strips, and the lens array is a lenticular lens array including lens elements with a pitch to height ratio in the range of $5 \geq P/H \geq 2$.

In an exemplary embodiment of the display component, the barrier and slit structure comprises a grid of barrier regions interspersed with aperture slit regions, and the lens array is a micro-lens array including lens elements with a pitch to height ratio in the range of $5 \geq P/H \geq 2$.

In an exemplary embodiment of the display component, a pitch of the barrier and slit structure relates to a pitch of the lens array with a ratio of $0.9 \leq barrier:lens \leq 1.1$.

In an exemplary embodiment of the display component, convex portions of lens elements of the lens array face toward the barrier and slit structure on the non-viewing side of the lens array.

In an exemplary embodiment of the display component, convex portions of lens elements of the lens array face away from the barrier and slit structure on the viewing side of the lens array.

In an exemplary embodiment of the display component, lens elements of the lens array are spaced apart from each other by transparent gaps.

In an exemplary embodiment of the display component, a light absorbing material is located between adjacent lens elements of the lens array.

In an exemplary embodiment of the display component, the display component further includes a spacer between the barrier and slit structure and the lens array to locate the lens array relative to the barrier and slit structure such that the separation between the lens apex and the barrier plane satisfies the range $5 \geq lens\ pitch/separation \geq 1$.

In an exemplary embodiment of the display component, the display component further includes a brightness enhancement film located between the backlight unit and the barrier and slit structure.

In an exemplary embodiment of the display component, the display component further includes a switchable device located on a viewing side of the lens array, wherein the switchable device is switchable between a first state corresponding to a narrow viewing angle display mode, and a second state corresponding to a wide viewing angle display mode.

In an exemplary embodiment of the display component, the display component further includes a switchable scattering device located on a viewing side of the lens array, wherein the switchable scattering device is switchable between a non-scattering state that collimates light from the backlight unit or has no effect on the angular distribution of light from the backlight unit, corresponding to a narrow viewing angle display mode, and a scattering state that scatters light from the backlight unit corresponding to a wide viewing angle display mode.

In an exemplary embodiment of the display component, the switchable scattering device comprises a hydrodynamic hybrid nematic (HHAN) liquid crystal cell.

In an exemplary embodiment of the display component, the display component further includes a front polarizer located on a viewing side of the switchable scattering device and/or a rear polarizer located on a non-viewing side of the switchable scattering device; and a first brightness enhancement film located on a non-viewing side of the switchable scattering device and/or a second brightness enhancement film located on a viewing side of the switchable scattering device.

Another aspect of the invention is a display system that is operable in a narrow viewing angle private mode and a wide viewing angle public mode, wherein the display system includes the display component according to any of the embodiments in combination with an image panel. The display system further includes a switchable scattering device located on a viewing side of the display component, wherein the switchable scattering device is switchable between a non-scattering state that collimates light from the backlight unit or has no effect on the angular distribution of light from the backlight unit, corresponding to the narrow viewing angle private mode, and a scattering state that scatters light from the backlight unit corresponding to the wide viewing angle public mode. The display system may include one or more of the following features, either individually or in combination.

In an exemplary embodiment of the display system, the switchable scattering device comprises a hydrodynamic hybrid nematic (HHAN) liquid crystal cell.

In an exemplary embodiment of the display system, the image panel is located on a viewing side of the switchable scattering device.

In an exemplary embodiment of the display system, the image panel is located on a non-viewing side of the switchable scattering device.

In an exemplary embodiment of the display system, the display system further includes a front polarizer located on a viewing side of the switchable scattering device and/or a rear polarizer located on a non-viewing side of the switchable scattering device; and a first brightness enhancement film located on a non-viewing side of the switchable scattering device and/or a second brightness enhancement film located on a viewing side of the switchable scattering device.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

Embodiments of the present invention are applicable to many display devices in which a strong narrow angle view private mode is desirable in additional to a wide angle view public mode. A strong private mode in particular is desirable for portable electronic display devices that are commonly used in a public setting. Examples of such devices include mobile phones including smartphones, personal digital assistants (PDAs), and tablet and laptop computers. The strength of the privacy mode further is suitable for automotive applications, in which regulatory and general safety considerations require that a driver be unable to view moving image content being viewed by a passenger.

REFERENCE SIGNS LIST

10—conventional LCD configuration
12—backlight
14—light
16—view angle control film
18—LCD image panel
20—enhanced LCD configuration
22—view angle control LCD
30—barrier and slit structure
30a—barrier and slit configuration
30b—barrier and slit configuration
32—opaque barrier regions
32a—parallel barrier strips
32b—barrier grid
34—transparent slit regions
34a—parallel slits
34b—aperture slits
36—substrate
40—lens array
40a—lenticular lens array
40b—micro-lens array
41—lens array with gaps
41a—lenticular lens array
41b—micro-lens array
42—lens elements
42a—strips of lens elements
42b—two-dimensional array of lens elements
43—gaps
43a—gaps
43b—gaps
44—transparent substrate
45—light absorbing coating
50—backlight system
50a—backlight system
52—lens array
53—transparent substrate
54—barrier and slit structure
54a—barrier and slit structure
54b—barrier and slit structure
54c—barrier and slit structure
55—spacer
57—optically transparent glue
59—backlight unit
62—slits
64—reflective metal barrier region
66—transparent substrate
68—patterned reflective metal barrier regions
70—patterned adhesion layer
72—patterned light absorbing material layer
74—reflective barrier regions
80—conventional black card barrier system
88—exemplary display component
90—view angle control HHAN cell
92—front (viewing side) polarizer
94—rear (non-viewing) side polarizer
96—first electrode substrate
98—first electrode layer
100—first LC alignment layer
102—switchable doped liquid crystal LC layer
104—second alignment layer
106—second electrode layer
108—second electrode substrate
110—display component
112—first DBEF
114—display component
116—second DBEF
120—display system
122—scattering device
124—image panel
130—display system
131—display system
131a—display system
132—backlight unit
134—DBEF
136—lens array and reflective barrier system
138—HHAN cell
140—LCD image panel

What is claimed is:

1. A display component for controlling a viewing angle in a display system, the display component comprising:
a backlight unit that emits light from a non-viewing side of the display component toward a viewing side of the display component;
a barrier and slit structure located on a viewing side of the backlight unit, the barrier and slit structure comprising a plurality of opaque barrier regions interspersed with a plurality of transparent slit regions; and
a lens array of lens elements located on a viewing side of the barrier and slit structure, with the lens elements being located in a separate plane relative to the barrier regions, wherein the barrier and slit structure and the lens array operate to transmit light from the backlight unit collimated in a limited viewing angle range;

wherein the barrier regions are reflective barrier regions that recycle light emitted from the backlight unit, and the barrier and slit structure comprises a patterned reflective metal layer deposited on a transparent substrate.

2. The display component of claim 1, wherein the barrier and slit structure further comprises a patterned light absorbing material deposited on a viewing side of the reflective barrier regions.

3. The display component of claim 1, wherein the barrier regions and slit regions are parallel strips, and the lens array is a lenticular lens array including lens elements with a pitch to height ratio in the range of 5≥P/H≥2.

4. The display component of claim 1, wherein the barrier and slit structure comprises a grid of barrier regions interspersed with aperture slit regions, and the lens array is a micro-lens array including lens elements with a pitch to height ratio in the range of 5≥P/H≥2.

5. The display component of claim 1, wherein a pitch of the barrier and slit structure relates to a pitch of the lens array with a ratio of 0.9≤barrier:lens≤1.1.

6. The display component of claim 1, wherein convex portions of lens elements of the lens array face toward the barrier and slit structure on the non-viewing side of the lens array.

7. The display component of claim 1, wherein convex portions of lens elements of the lens array face away from the barrier and slit structure on the viewing side of the lens array.

8. The display component of claim 1, wherein lens elements of the lens array are spaced apart from each other by transparent gaps.

9. The display component of claim 1, wherein a light absorbing material is located between adjacent lens elements of the lens array.

10. The display component of claim 1, further comprising a spacer between the barrier and slit structure and the lens array to locate the lens array relative to the barrier and slit structure such that the separation between the lens apex and the barrier plane satisfies the range 5≥lens pitch/separation≥1.

11. A display component for controlling a viewing angle in a display system, the display component comprising:
a backlight unit that emits light from a non-viewing side of the display component toward a viewing side of the display component;
a barrier and slit structure located on a viewing side of the backlight unit, the barrier and slit structure comprising a plurality of opaque barrier regions interspersed with a plurality of transparent slit regions;
a lens array of lens elements located on a viewing side of the barrier and slit structure, with the lens elements being located in a separate plane relative to the barrier regions, wherein the barrier and slit structure and the lens array operate to transmit light from the backlight unit collimated in a limited viewing angle range; and
a switchable device located on a viewing side of the lens array, wherein the switchable device is switchable between a first state corresponding to a narrow viewing angle display mode, and a second state corresponding to a wide viewing angle display mode.

12. A display component for controlling a viewing angle in a display system, the display component comprising:
a backlight unit that emits light from a non-viewing side of the display component toward a viewing side of the display component;
a barrier and slit structure located on a viewing side of the backlight unit, the barrier and slit structure comprising a plurality of opaque barrier regions interspersed with a plurality of transparent slit regions;
a lens array of lens elements located on a viewing side of the barrier and slit structure, with the lens elements being located in a separate plane relative to the barrier regions, wherein the barrier and slit structure and the lens array operate to transmit light from the backlight unit collimated in a limited viewing angle rage; and
a switchable scattering device located on a viewing side of the lens array, wherein the switchable scattering device is switchable between a non-scattering state that collimates light from the backlight unit or has no effect on the angular distribution of light from the backlight unit, corresponding to a narrow viewing angle display mode, and a scattering state that scatters light from the backlight unit corresponding to a wide viewing angle display mode.

13. The display component of claim 12, wherein the switchable scattering device comprises a hydrodynamic hybrid nematic (HHAN) liquid crystal cell.

14. A display system that is operable in a narrowing viewing angle private mode and a wide viewing angle public mode comprising:
the display component according to claim 1;
a switchable scattering device located on a viewing side of the display component, wherein the switchable scattering device is switchable between a non-scattering state that collimates light from the backlight unit or has no effect on the angular distribution of light from the backlight unit, corresponding to the narrow viewing angle private mode, and a scattering state that scatters light from the backlight unit corresponding to the wide viewing angle public mode; and
an image panel located on a viewing side of the display component.

15. The display system of claim 14, wherein the switchable scattering device comprises a hydrodynamic hybrid nematic (HHAN) liquid crystal cell.

16. The system device of claim 14, wherein the image panel is located on a viewing side of the switchable scattering device.

17. The display system of claim 14, wherein the image panel is located on a non-viewing side of the switchable scattering device.

18. The display system of claim 14, further comprising:
a front polarizer located on a viewing side of the switchable scattering device and/or a rear polarizer located on a non-viewing side of the switchable scattering device; and
a first brightness enhancement film located on a non-viewing side of the switchable scattering device and/or a second brightness enhancement film located on a viewing side of the switchable scattering device.

* * * * *